(12) United States Patent
Lee et al.

(10) Patent No.: US 7,499,829 B2
(45) Date of Patent: Mar. 3, 2009

(54) LASER RANGEFINDER AND METHOD THEREOF

(75) Inventors: Seok-Hwan Lee, Incheon (KR); Jae-Young Lee, Seoul (KR); Ki-Choul Nam, Seongnam (KR); Kyung-Mok Kang, Incheon (KR); Geun-Sik Yoo, Incheon (KR)

(73) Assignee: A&D Engineering Co., Ltd, Daerim-Dong, Yeongdeungpo-gu, Seoul (KR)

( * ) Notice: Subject to any disclaimer, the term of this patent is extended or adjusted under 35 U.S.C. 154(b) by 0 days.

(21) Appl. No.: 10/564,207

(22) PCT Filed: Aug. 20, 2003

(86) PCT No.: PCT/KR03/01681

§ 371 (c)(1),
(2), (4) Date: Dec. 18, 2006

(87) PCT Pub. No.: WO2005/006016

PCT Pub. Date: Jan. 20, 2005

(65) Prior Publication Data

US 2007/0255525 A1      Nov. 1, 2007

(30) Foreign Application Priority Data

Jul. 10, 2003     (KR) ................... 10-2003-0046882

(51) Int. Cl.
*G01B 5/02* (2006.01)
*G01B 5/14* (2006.01)
*G01B 7/02* (2006.01)
*G01B 7/14* (2006.01)
*G01B 11/02* (2006.01)
*G01B 11/14* (2006.01)
*G01B 13/02* (2006.01)

(52) U.S. Cl. ...................................... 702/159
(58) Field of Classification Search ................. 702/158, 702/159; 356/4.01, 4.07, 28; 250/208.1, 250/216

See application file for complete search history.

(56) References Cited

U.S. PATENT DOCUMENTS

| | | | |
|---|---|---|---|
| 4,208,125 A | 6/1980 | Ling ........................... 356/5 |
| 5,691,808 A * | 11/1997 | Nourrcier et al. ........... 356/5.01 |
| 6,563,105 B2 * | 5/2003 | Seibel et al. ............... 250/208.1 |
| 6,781,677 B1 * | 8/2004 | Muenter et al. ............. 356/5.05 |
| 2003/0035097 A1 | 2/2003 | Lai et al. |

FOREIGN PATENT DOCUMENTS

EP          0 757 257 A2      2/1997

* cited by examiner

*Primary Examiner*—Michael P Nghiem

(57) ABSTRACT

Disclosed is a laser rangefinder and method thereof. By using characteristics that noise has non-correlation and signals have correlation, laser beams are output to a target to find a range to the target with iteration rates of thousands of times per second, signals for each range-finding are binary-quantized using a sampling frequency corresponding to a range-finding resolving power, and data are accumulated. After this, the accumulated data are processed in a statistical manner to detect a target signal and produce a target range based on the target signal. According to the present invention, the rangefinder for outputting low-power laser beams, using the laser beams reflected from the target, and detecting a range to the target, easily and accurately detects target signals in the noise.

11 Claims, 8 Drawing Sheets

FIG.4
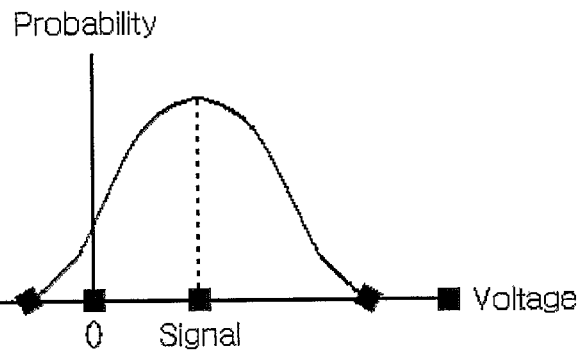
(a) Signals superimposed normal distribution noise
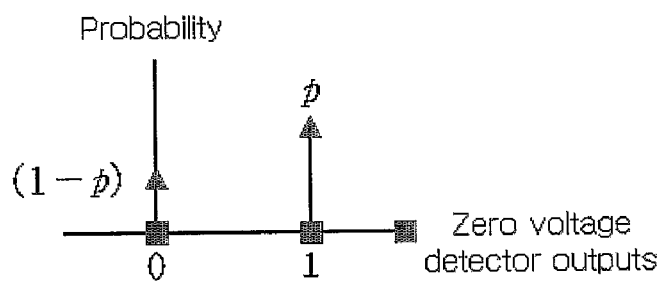
(b) Binary detection probability distribution
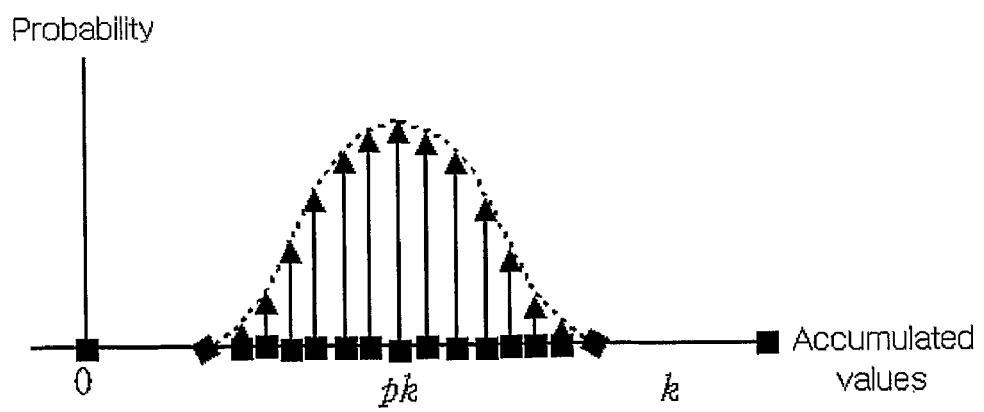
(c) Cumulative probability distribution

LASER RANGEFINDER AND METHOD THEREOF

BACKGROUND OF THE INVENTION (a) Field of the Invention

The present invention relates to a rangefinder. More specifically, the present invention relates to a laser rangefinder and method thereof.

(b) Description of the Related Art

Conventional laser rangefinders generally use high-power lasers of several megawatts, and intensities of signals reflected from a target (target signals) are much higher than those of system noise including optical noise, detector noise, and amplifier noise, and accordingly, the laser rangefinders easily detect the target signals through a simple threshold detection method.

However, since the high-power lasers may damage human eyes, the laser outputs have recently been regulated, and a need for rangefinders that use low-power laser diodes that are safe for the eyes has been raised. Thus, new signal processing technology studies for increasing the ranges have actively progressed.

A representative laser diode rangefinder for eyesight protection is an electro-optical system for geodetic surveys, which is currently sold in the commercial market. However, since the electro-optical system shoots modulated laser beams toward a retroreflector installed on a target location, and detects a phase of the signal reflected from the retroreflector to find a range, it is far different from the electro-optical system that uses a pulse detection method without the retroreflector in the principle of signal processing techniques.

Since an output of the target signal reflected from the target is less than the system noise including optical noise, detector noise, and amplifier noise in the electro-optical system using low-power laser diodes and the pulse detection method, it is not easy to detect the target signal. Accordingly, signal processing techniques for accurately detecting a target signal in a rangefinder that uses low-power laser diodes for eyesight protection are required.

SUMMARY OF THE INVENTION

It is an advantage of the present invention to use low-power laser diodes, and to accurately detect a target signal from a rangefinder according to a pulse detection method.

It is an advantage of the present invention to detect a target signal hidden in noise to improve range-finding performance of the rangefinder.

To achieve the advantages, a rangefinder for eyesight protection using a pulse detection method without a retroreflector according to the present invention uses characteristics that noise has non-correlation and signals have correlation to find a range to a target in the repetition rate of several thousand times per second, execute binary-quantization on the signal for each finding into a sampling frequency matched with range-finding resolving power, and accumulate data. After this, the rangefinder processes the accumulated data statistically (i.e., performs a cumulative binary detection method) to detect a target signal (a signal corresponding to a laser beam reflected from the target, and noise is canceled from the signal), and calculates a target range (a range to the target) based on the detected target signal.

In one aspect of the present invention, a method for finding a range comprises: (a) receiving laser beams reflected from a target and input, and outputting a corresponding electrical signal; (b) converting the electrical signal into range-finding data; (c) sequentially storing the range-finding data; (d) adding the stored range-finding data and previously processed and stored accumulated data, and storing results as accumulated data; (e) detecting data exceeding a threshold value from among the accumulated data as target signals; and (f) reading a target range based on the detected target signals, wherein (a) through (d) are repeated N times, and the accumulated data in (e) are obtained by repeating (a) through (d) N times.

The (a) comprises: receiving the laser beams, converting the same into a corresponding photocurrent signal, and converting the signal into a voltage signal, and (b) comprises: differentiating the voltage signal to cancel a voltage component superimposed on the voltage signal and caused by background scattering of laser beams exponentially decreasing according to ranges.

The method further comprises: filtering the differentiated signal with a predetermined frequency bandwidth identical to a frequency band of the target signal, wherein the bandwidth satisfies $0.35/t_r$ ($t_r$ is a rising time of a laser pulse), and a cut-off frequency satisfies $1/2\tau$ ($\tau$ is a full width at half the maximum).

The target range in (f) is an address of a memory storing accumulated data greater than the threshold value.

In another aspect of the present invention, a laser rangefinder for finding a range to a target using laser beams comprises: a laser receiver for receiving laser beams reflected from the target to output an electrical signal, canceling a noise component provided in the electrical signal, and outputting binary range-finding data; a data accumulator, including a frame memory, for adding the range-finding data output by the laser receiver and previously accumulated data stored in the frame RAM, storing the added results in the frame memory, and repeating the adding and storing operations for an established time; and a range detector for producing a target range to the target based on the accumulated data stored in the frame memory.

The laser receiver comprises: a photodetector for receiving the laser beams and outputting a corresponding photocurrent signal; an amplifier for amplifying the photocurrent signal and converting it into a voltage signal; a differentiator for differentiating the voltage signal and canceling a noise voltage component superimposed on the voltage signal; a filter for filtering the differentiated signal; and a signal converter for converting the filtered signal into binary range-finding data, and outputting the range-finding data for each frame.

The data accumulator further comprises: a shift register for sequentially storing the range-finding data; an adder for adding the range-finding data stored in the shift register and previously accumulated data stored in the frame memory, and storing the added results in the frame memory; a counter for counting range-finding time; and a timing controller for operating the shifter register and the adder until the range-finding time exceeds the established time, and repeating the storing, operating, and accumulating process of the range-finding data N times.

The range detector comprises: a target signal detector for detecting the data exceeding the established threshold value as a target signal from among the accumulated data stored in the frame memory; and a range reader for reading an address of the frame memory storing the detected target signal as a target range.

In still another aspect of the present invention, a signal receiver of a laser rangefinder for finding a range to a target using laser beams is provided, and the signal receiver for receiving laser beams reflected from the target and generating corresponding range-finding data comprises: a photodetector for receiving the laser beams and outputting a corresponding photocurrent signal; an amplifier for amplifying the photocurrent signal and converting it into a voltage signal; a differentiator for differentiating the voltage signal to cancel a noise voltage component superimposed on the voltage signal; a filter for filtering the differentiated signal; and a zero voltage detector for comparing the filtered signal with a zero voltage, outputting 1 when the signal is a positive voltage, and 0 when the signal is a negative voltage to generate and output binary range-finding data.

In still yet another aspect of the present invention, a range detecting device of a laser rangefinder for finding a range to a target using laser beams is provided, and the range detecting device for detecting a target range based on range-finding data corresponding to the laser beams reflected and received from the target comprises a data accumulator including: a shift register for sequentially storing the range-finding data; a frame memory for storing previously accumulated data; an adder for adding the range-finding data stored in the shift register and the previously accumulated data stored in the frame memory, and storing the added results in the frame memory; a counter for counting range-finding time; and a timing controller for operating the shifter register and the adder until the range-finding time exceeds the established time, and repeating the storing, operating, and accumulating process of the range-finding data N times; and a range detector including: a target signal detector for detecting data exceeding an established threshold value as target signals from among accumulated data stored in the frame memory; and a range reader for reading an address of the frame memory storing the detected target signal as a target range.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 shows an exemplified cumulative binary detection probability distribution according to a preferred embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
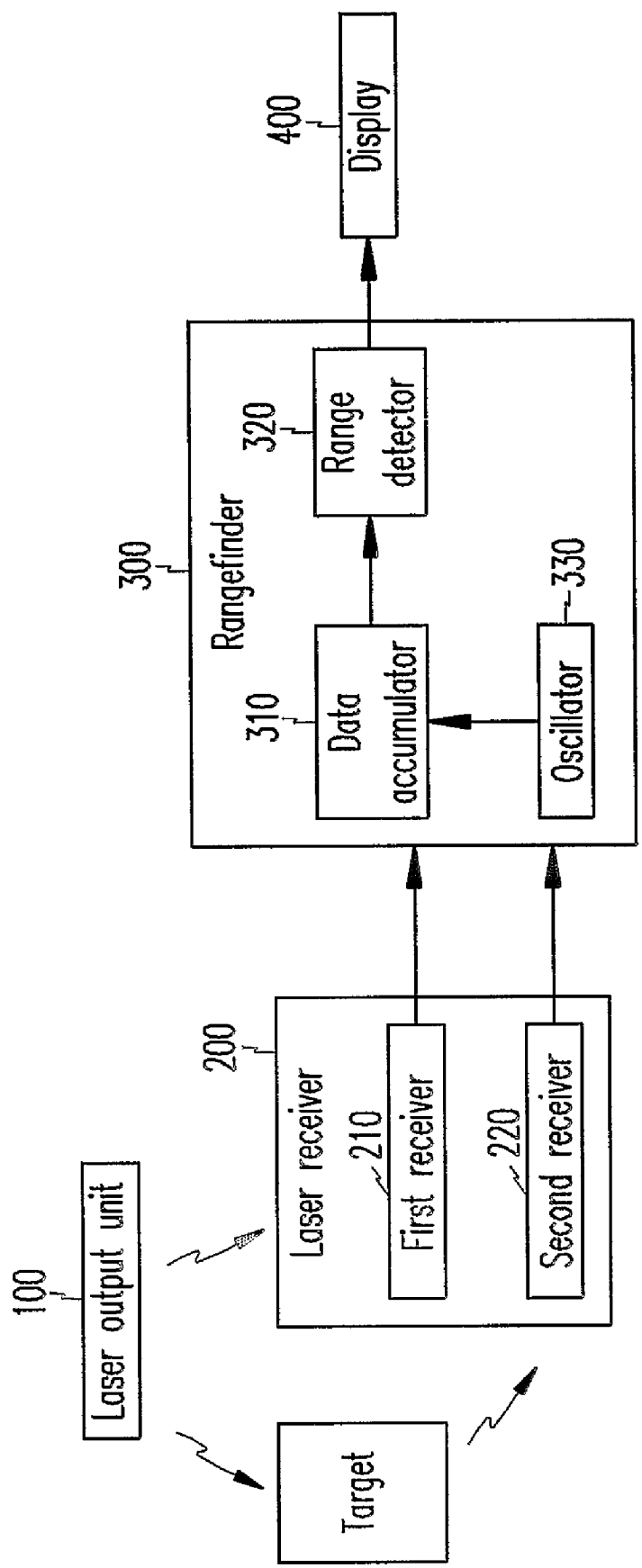
FIG. 1 shows a block diagram of a laser rangefinder according to a preferred embodiment of the present invention.

FIG. 1 shows a block diagram of a laser rangefinder according to a preferred embodiment of the present invention.

As shown, the laser rangefinder comprises a laser output unit 100 for outputting laser beams to a target, a laser receiver 200 receiving the laser beams reflected from the target and outputting corresponding electrical signals, a rangefinder 300 for finding a range up to the target based on the received signals, and a display 400 for displaying the found range.

The laser output unit 100 comprises a laser diode for outputting laser beams in the near infrared ray band.

The laser receiver 200 comprises a first receiver 210 for receiving the laser beams (referred to as first laser beams hereinafter) output by the laser output unit 100, processing the first laser beams, and outputting laser oscillation signals; and a second receiver 220 for receiving the laser beams (referred to as second laser beams hereinafter) output by the laser output unit 100 and reflected from the target, processing the second laser beams, and outputting range-finding data.

Figure 2:
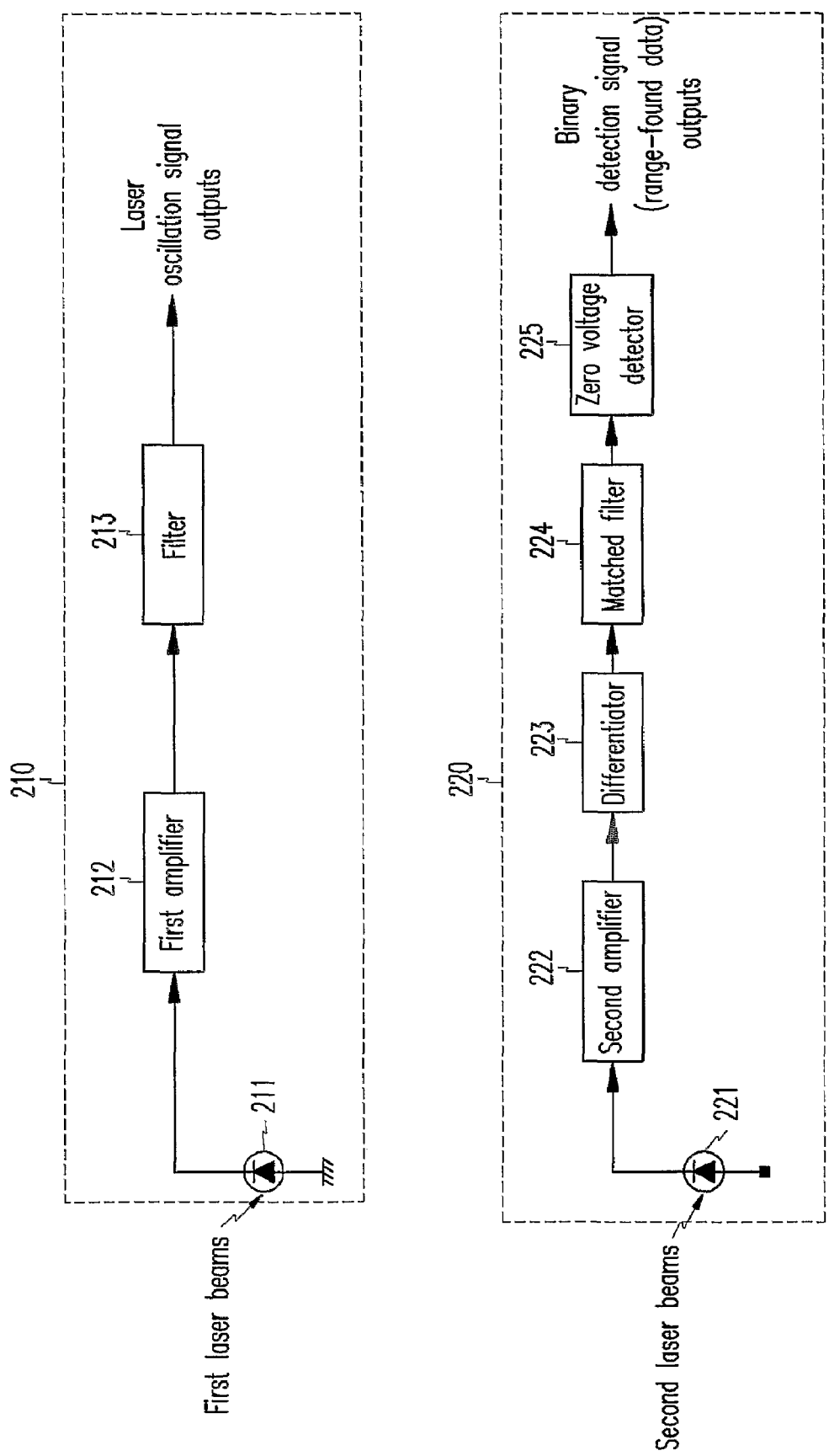
FIG. 2 shows a detailed configuration diagram of a laser receiver shown in FIG. 1.

FIG. 2 shows a detailed configuration diagram of a laser receiver 200 shown in FIG. 1.

The first receiver 210 comprises a first photodetector 211 for receiving the first laser beam to output a corresponding photocurrent signal, a first amplifier 212 for amplifying the photocurrent signal output by the first photodetector 211 to output a corresponding voltage signal, and a filter 213 for filtering the voltage signal to output a laser oscillation signal.

The second receiver 220 can be referred to as an analog signal processor for finding target signals. As shown in FIG. 2, the second receiver 220 comprises: a second photodetector 221 for receiving the second laser beam to output a corresponding photocurrent signal; a second amplifier 222 for amplifying the photocurrent signal output by the second photodetector 221 to output a voltage signal; a differentiator 223 for differentiating the voltage signal to minimize detection errors caused by signal intensities and pulse width variations, and canceling DC components superimposed on the voltage signal; a matched filter 224 for filtering differential signals with a predetermined frequency bandwidth identical with the frequency band of the differentiated signal to maximize the SNR (signal to noise ratio); and a zero voltage detector 225, a signal converter for converting filtered signals into range-finding data that are binary detection signals, for comparing the filtered voltage with a zero voltage to convert a positive voltage into 1, and a negative voltage into 0 (here, 1 and 0 are respectively range-finding data that are 1-bit binary signals), and outputting the data. In this instance, the zero voltage detector is used as the signal converter, and without being restricted to this, other types of signal converters such as an A/D converter can also be used.

Figure 3:
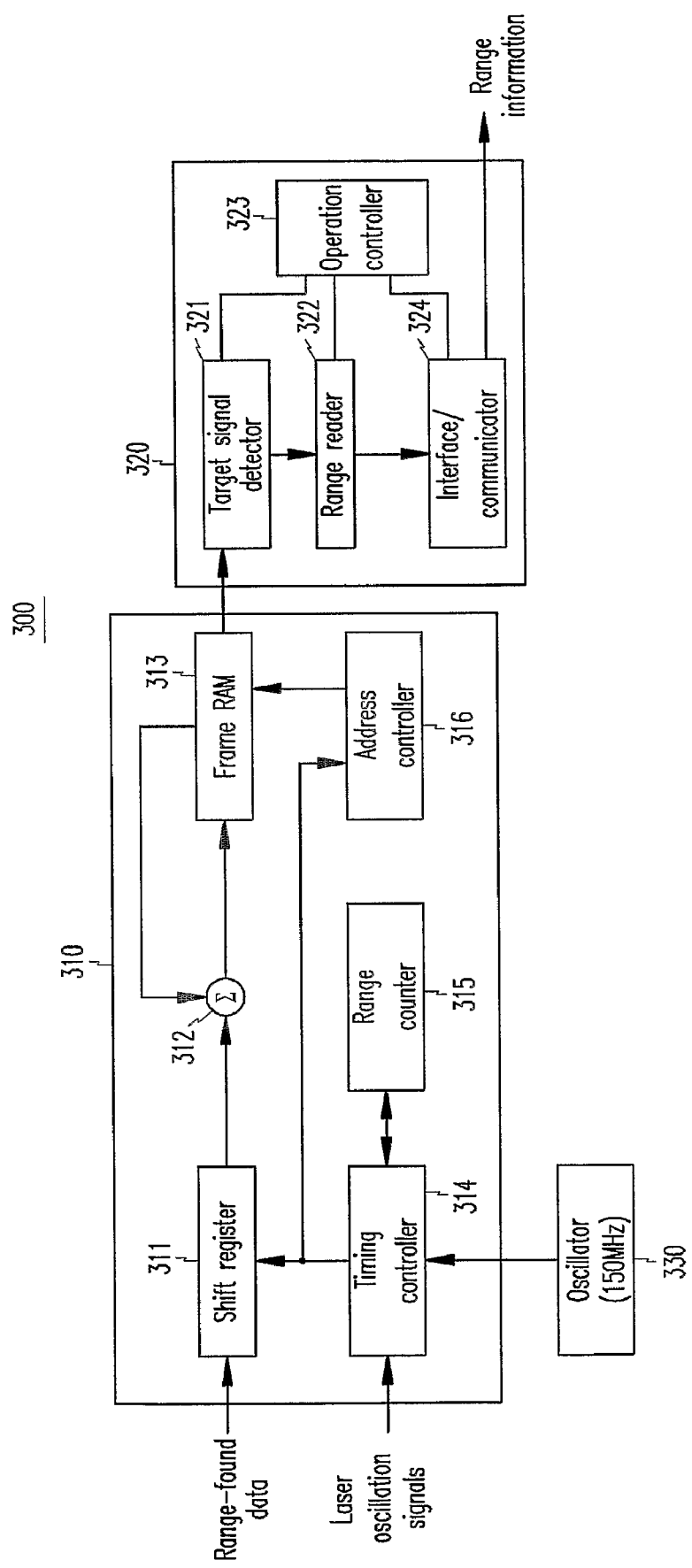
FIG. 3 shows a detailed configuration diagram of a range detector shown in FIG. 1.

FIG. 3 shows a detailed configuration of the rangefinder 300 for finding a range to a target based on the laser oscillation signal output by the laser receiver 200 and the range-finding data.

As shown in FIGS. 1 and 3, the rangefinder 300 comprises: a data accumulator 310 for accumulating a detection signal, that is, range-finding data N times, and storing the same; a range detector 320 for detecting a target signal based on the accumulated data, and finding the range up to the target based on the target signal; and an oscillator 330 for outputting oscillation signals.

The data accumulator 310 comprises a shift register 311 for sequentially storing range-finding data output by the second receiver 220; a frame RAM (random access memory) 313 for storing previously accumulated data; an adder 312 for adding the range-finding data stored in the shift register 311 and the previously accumulated data stored in the frame RAM 313 to store added data in the frame RAM 313; a timing controller 314 for generating a plurality of control signals needed for signal processing according to oscillation signals output by the oscillator 330; a range counter 315 for counting finding time according to control by the timing controller 314; and an address controller 316 for controlling data storage into the shift register 311 and the frame RAM 313 according to control by the timing controller 314.

In this instance, the timing controller 314 outputs a laser start pulse according to a laser oscillation signal output by the first receiver 210. The range counter 315 starts to count the range-finding time according to the laser start pulse, and outputs a laser stop pulse to terminate the counting operation when an established time elapses. The timing controller 314 outputs a laser start pulse and concurrently drives the shift register 311 and the address controller 316 to perform a data accumulation operation for storing, adding, and accumulating the range-finding data output by the second receiver 220, and terminates the data accumulation operation according to the laser stop pulse output by the range counter 315. The data accumulator 310 can be realized into an FPGA (field programming gate array).

The range detector 320, for detecting a target signal based on the data accumulated by the data accumulator 310, and detecting a range to the target based on the target signal, comprises: a target signal detector 321 for finding a target signal from the accumulated data stored in the frame RAM 321 by using a cumulative binary detection algorithm; a range reader 322 for reading the detected target signal by a predetermined resolving power to generate range information; an operation controller 323 for controlling the above-noted range information generation process; and an interface/communicator 324 for outputting finding range information to the display 400 and linking with an external device.

Here, the target signal corresponds to the second laser beams output by the laser output unit 100, reflected from the target, and then input, and it is a noise-cancelled pure laser beams. The range detector 320 can be realized with a DSP (digital signal processor).

An operation of the above-configured laser rangefinder will now be described.

First, the cumulative binary detection algorithm according to the preferred embodiment will be described. FIG. 4 shows distribution characteristics of noise and signals processed by the cumulative binary detection algorithm.

The cumulative binary detection algorithm accumulates the range-finding data that are binary detection signals to increase the SNR on the assumption that the signal and noise maintain non-correlation and occur at the same time, and the noise follows the Gaussian distribution with a mean value of 0.

Based on this assumption, when the positive voltage is detected N times to 1 and the negative voltage is detected N times to 0 through the zero voltage detector and they are accumulated in the Gaussian distribution noise with the mean value of 0, the mean of the accumulated noise distribution becomes $0.5N$, and the standard deviation becomes $0.5\sqrt{N}$.

When a target signal is superimposed on the Gaussian distribution noise, its probability distribution horizontally moves by the intensity of the superimposed signal as shown in FIG. 4(a). Therefore, the mean of N-times accumulated cumulative probability distributions becomes pN, the standard deviation becomes $\sqrt{p(1-p)N}$, and the SNR is improved by $\sqrt{N}$ times. In this instance, 'p' is a probability that the output of the zero voltage detector is 1 when a signal is provided.

Hence, a false alarm rate (a probability of falsely detecting a signal as a target signal) and a detection probability $P_D$ in the cumulative binary detection algorithm can be given as Equation 1 according to the TNR (threshold to noise ratio) and the SNR.

$$FAR = N_S \int_{L_T}^{\infty} \frac{1}{0.5\sqrt{N}\sqrt{2\pi}} e^{-\frac{(x-0.5N)^2}{0.5N}} dx = \qquad \text{Equation 1}$$

$$N_S\left(0.5 - \int_0^{TNR} \frac{1}{\sqrt{2\pi}} e^{-\frac{y^2}{2}} dy\right)$$

$$P_D = \int_{L_T}^{\infty} \frac{1}{\sqrt{p(1-p)N}\sqrt{2\pi}} e^{-\frac{(x-pN)^2}{2p(1-p)N}} dx = \qquad \text{Equation 2}$$

$$0.5 + \int_0^{SNR(N)-TNR} \frac{1}{\sqrt{2\pi}} e^{-\frac{y^2}{2}} dy$$

where FAR is a false alarm rate, $N_s$ is a number of range finding samples=maximum finding range/range finding resolving power, N is accumulated times, $L_T$ is a threshold value=$0.5\sqrt{N}(TNR)+0.5N$, TNR is a threshold-to-noise ratio, SNR(1) is a signal-to-noise ratio of the system, and SNR(N) is the SNR when accumulated N times=$\sqrt{N(SNR(1))}$.

Effects of the cumulative binary detection algorithm given in Equations 1 and 2 will now be exemplarily described.

As an example, it is assumed that the FAR is less than 0.1%, a detection probability is greater than 99.9%, the maximum finding range is 3,000 m, a range finding resolving power is 1 m, and a number of accumulations is 1,024. Since $N_S$=3,000 according to the above-given Equations, $L_T$=592, TNR=5, SNR(1024)=8.1, and SNR(1)=0.253. These results show that the target signal which is ¼ times of the system noise, that is, a signal in the noise can be detected, and this represents that a system having the same range finding performance as that of the conventional rangefinder can be realized with the power which is 1/32 times less than that of the laser beams used by the conventional rangefinder.

Figure 5:
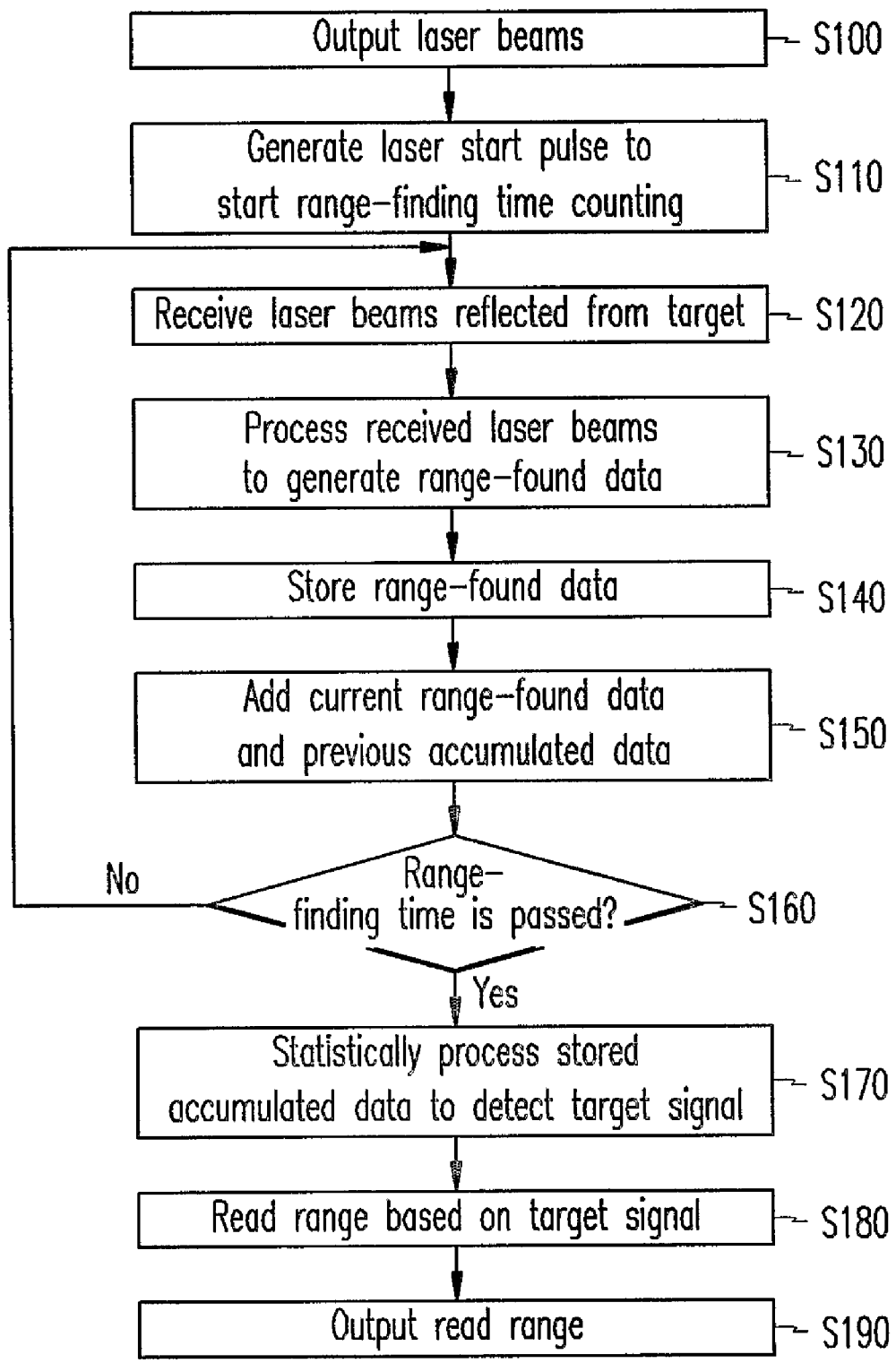
FIG. 5 shows an operation flowchart of a laser rangefinder according to a preferred embodiment of the present invention.

FIG. 5 shows an operational flowchart of the laser rangefinder according to the preferred embodiment of the present invention.

When the laser output unit 100 outputs low-power laser beams to find a range to a target, the first receiver 210 of the laser receiver 200 detects the output laser beams to output a laser oscillation signal in step S100.

The first photodetector 211 of the first receiver 210 receives the laser beams output by the laser output unit 100 to output corresponding photocurrent signals, the first amplifier 212 amplifies the photocurrent signals and converts them into voltage signals, and the filter 213 filters the voltage signals to output a laser oscillation signal.

When receiving the laser oscillation signal from the first receiver 210, that is, when receiving a signal for representing that laser beams have been output to the target from the laser output unit 100, the timing controller 314 of the data accumulator 310 generates a laser start pulse to output it to the range counter 315. The range counter 315 starts counting for receiving, operating, and storing data used for finding a range in step S110.

The laser beams output by the laser output unit 100 are reflected from the target A, and input to the second receiver 220 of the laser receiver 200, and in this instance, noise is superposed on the input laser beams in step S120. Therefore, in the preferred embodiment, the beams to be described below are processed so as to detect the low-power laser beams (the laser beams reflected from the target) input together with the noise.

Figure 6:
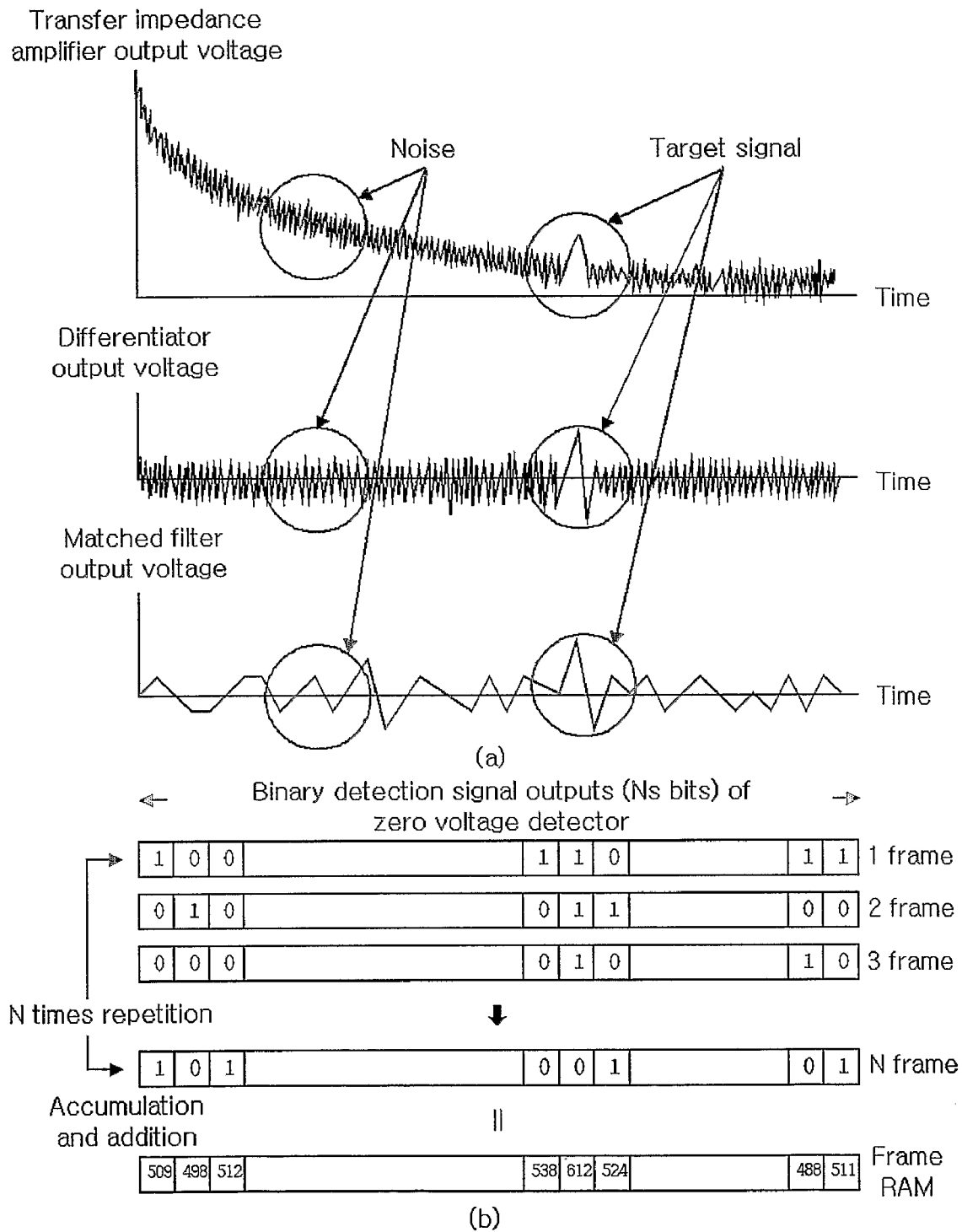
FIG. 6 shows exemplified analog signal waveforms and binary detection signal outputs according to a preferred embodiment of the present invention.

FIG. 6 shows analog signal waveforms and binary detection signal outputs processed and output by the second receiver according to the preferred embodiment of the present invention.

In detail, the second photodetector 221 of the second receiver 220 outputs photocurrent signals corresponding to the input beams, and the second amplifier 222 amplifies the photocurrent signals, converts them into voltage signals, and outputs the voltage signals.

Figure 7:
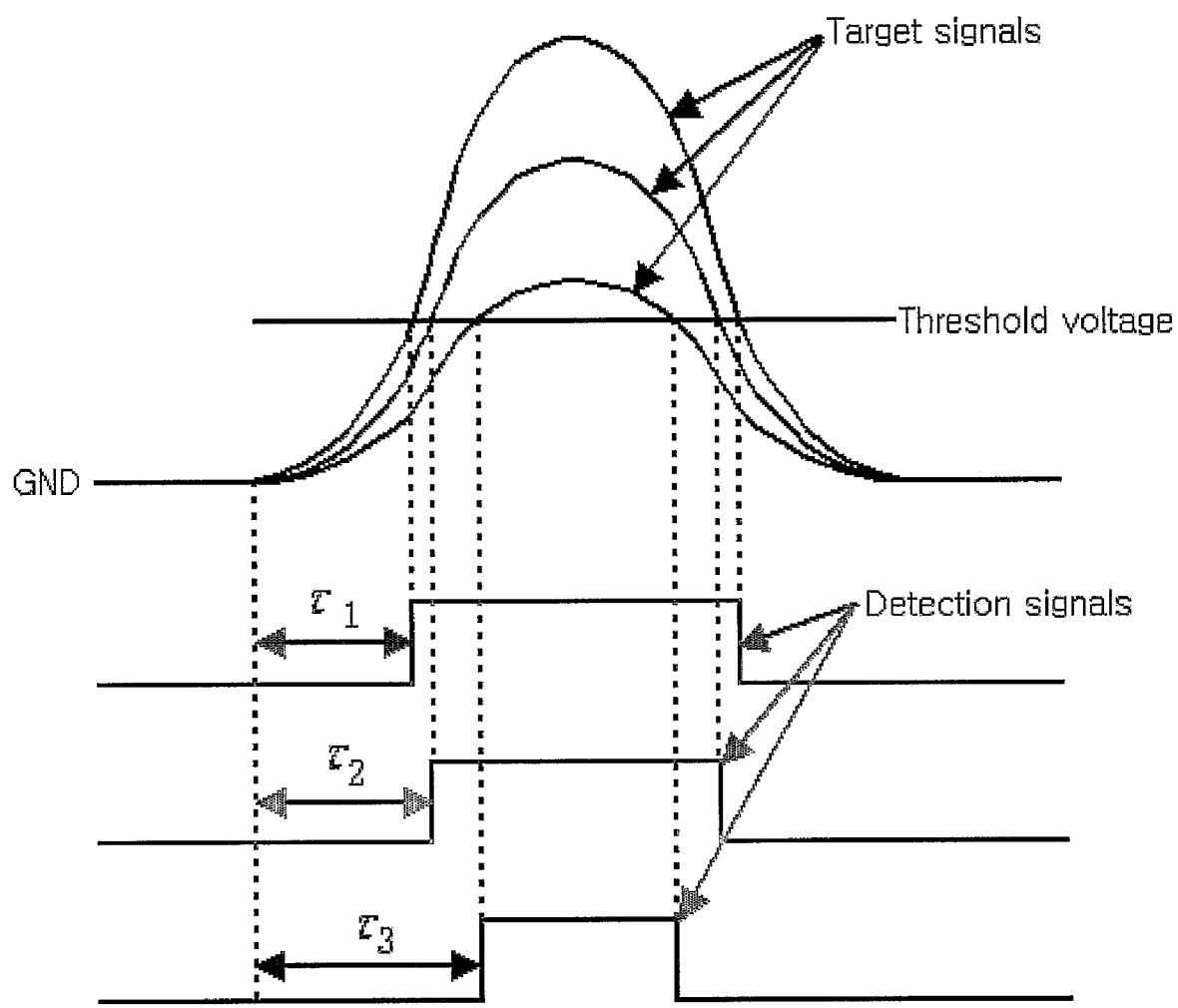
FIG. 7 shows pulse detection errors following a conventional threshold detection method.

In this instance, the outputs of the second amplifiers include a target signal and system noise superimposed on the target signal as shown in FIG. 6(a). Among these noise components, since the noise caused by the scattered light generated when laser beams are passed through the atmosphere is very big in the near range and exponentially decreases according to the range, the above-noted noise becomes a factor of increasing false range-finding rates for falsely finding a range to the target. Conventional signal processing following the threshold detection method uses a time-varying gain controller to control the total amplification gain and solve the problem, but it still fails to remove pulse detection errors caused by intensity variations of the target signal. FIG. 7 shows conventional pulse detection errors caused by the range finding. When using the conventional method, the case of a very short pulse width and a range finding resolving power greater than 10 m (meters) does not give rise to much influence in the finding of errors, but the case of finding the range with the resolving power below 1 m generates large errors.

In the preferred embodiment, the differentiator 223 differentiates the voltage component superimposed on the voltage signal and caused by background scattering of the laser beams, to exponentially decrease it according to ranges to remove the voltage component. The matched filter 224 filters the differentiated signal with a predetermined frequency bandwidth identical with the frequency band of the target signal to remove RF noise of the differentiated signal and optimize the SNR. In this instance, the cut-off frequency fc of the filter is established as $1/2\tau$ when the full width at half the maximum of the laser pulse (laser beams output by the laser output unit) is defined as $\tau$. That is, fc=$1/2\tau$=25 MHz when $\tau$=20 ns.

Figure 8:
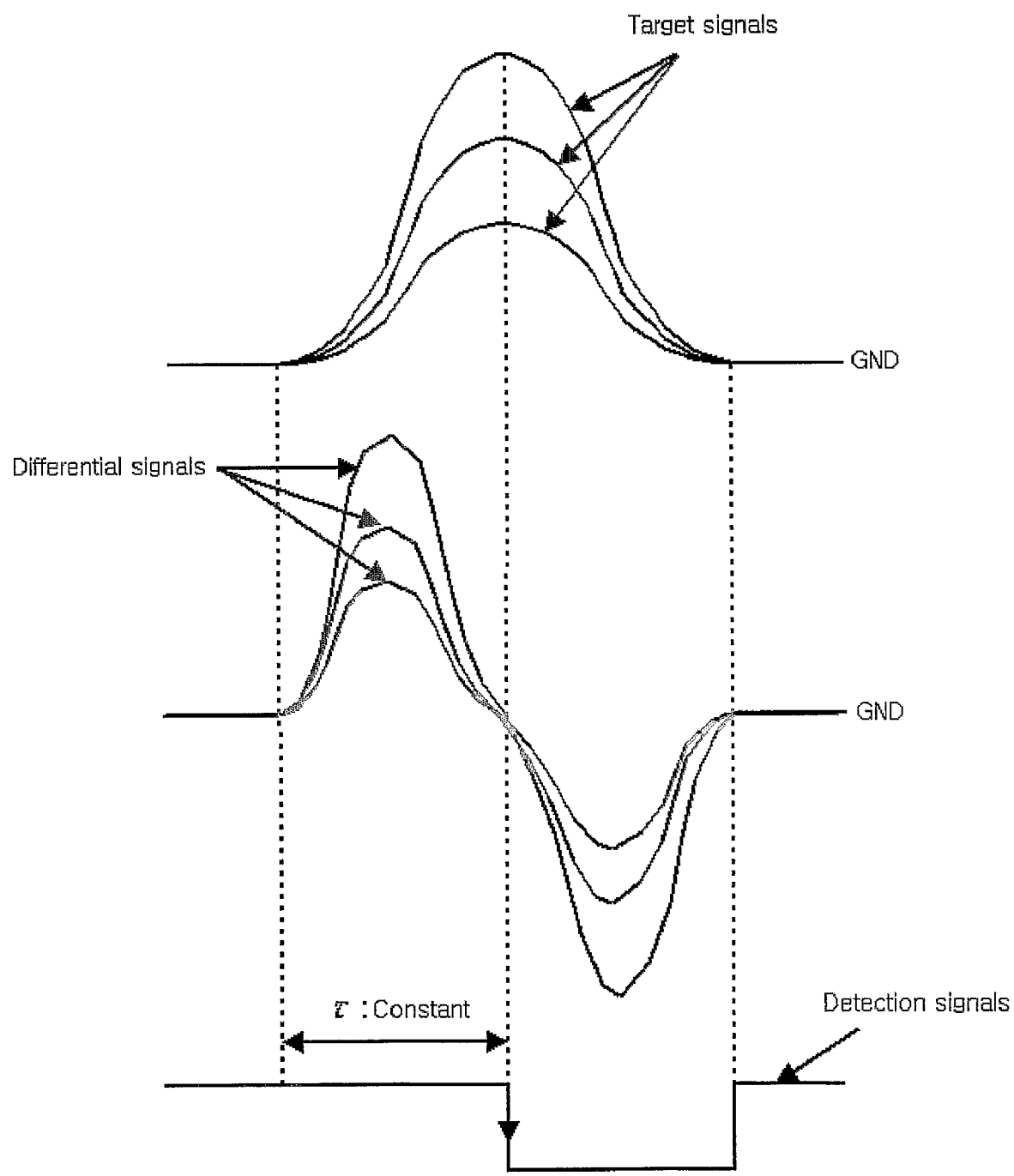
FIG. 8 shows pulse detection errors according to a preferred embodiment of the present invention.

Following the operations of the differentiator and the filter, provided is the effect of cutting off the DC-component scattered light with a predetermined frequency bandwidth identical to the frequency band (e.g., the bandwidth satisfies $0.35/t_r$ when a rising time of a laser pulse is set to be $t_r$, and here, the rising time is a time until the power of the laser diode of the laser output unit rises and laser beams are generated, and the bandwidth is designed to be $0.35/t_r$=35 MHz if $t_r$=10 ns.) of the target signal from among the received, processed, and output voltage signals. Also, the false range-finding rates are minimized and the pulse detection errors are effectively removed. FIG. 8 shows pulse detection errors according to the preferred embodiment of the present invention. According to the above-described differentiation operation, peak values of the target signals are detected at a predetermined position as shown in FIG. 8, thereby effectively removing the pulse detection errors.

Next, the zero voltage detector 225 processes the noise-cancelled signals into binary digital signals, and outputs them to the range detector 320.

The zero voltage detector 225 compares an output voltage of the matched filter 224 with the zero voltage to output as 1 when the output voltage is a positive voltage, and as 0 when it is a negative voltage, and as shown in FIG. 6(b), these binary detection signals are output per frame in step S130. In this instance, a single frame includes $N_S$(=3,000) bits, and a single bit corresponds to 1 m of range-finding resolving power.

As described above, when the second receiver 220 cancels the noise of the laser beams reflected from the target and then input, and generates binary detection signals, that is, range-finding data, the range detector 320 calculates the range to the target on the basis of the range-finding data as described below.

The range-finding data output by the second receiver 220 are provided to the data accumulator 310 of the range detector 320 to be accumulated for a range-finding time. In detail, the shift register 311 sequentially stores the range-finding data in frames output by the second receiver 220 in high storage rates according to control signals output by the timing controller 314 of the data accumulator 310 in step S140. The adder 312 adds, bit by bit, the range-finding data currently input and stored in the shift register 311 and the previously accumulated data stored in the frame RAM 313, and accumulates added results in the frame RAM 313 in step S150. In this instance, the address controller 316 controls the storage operation of the data in the shift register 311 and the frame RAM 313, and in particular, controls the accumulated data to be stored in the accurate addresses.

The process for operating and accumulating the range-finding data is repeated N times until the range-finding time counted by the range counter 315 exceeds an established time, and the above-noted process is repeated 1,024 times in the preferred embodiment of the present invention.

The range counter 315 starts to count the range-finding time according to the laser start pulse applied by the timing controller 314, and terminates the counting operation and outputs a laser stop pulse to the timing controller 314 when the range-finding time exceeds the established time. Accordingly, the range counter 315 counts a time difference between the laser start pulse and the laser stop pulse with the range-finding resolving power of 1 m.

The timing controller 314 stops the operations of the shift register 311, the adder 312, the frame RAM 313, and the address controller 316, and terminates the process of operating and accumulating the range-finding data when the range-finding time from the range counter 315 exceeds the established time to output a laser stop pulse in step S160.

When the process of operating and accumulating the range-finding data is terminated, respective components of the range detector 320 operate according to control by the operation controller 323 based on the accumulated data to detect a range to the target.

In detail, the target signal detector 321 reads the final accumulated data stored in the frame RAM 313, and detects data having a threshold value (e.g., greater than $L_T$=592) as target signals from among the final accumulated data in step S170.

Next, the range reader 322 reads target ranges based on the range-finding data, that is, the target signals in step S180. The detected target signals are plural when other objects exist near the desired target. Therefore, the range detector 322 sorts the detected target signals in the ascending order according to the addresses of the target signals stored in the frame RAM 313 when the target signals are plural, and the range detector 322 reads the respective addresses as the target ranges of the respective targets. In this instance, the range of the desired target becomes an address value that has the largest value from among the sorted addresses.

When the target signal greater than the threshold value is singular, the address of the frame RAM 313 storing the corresponding target signal becomes the target range.

The target range (range information) detected as described above is output to the display 400 through the interface/communicator 32D, and the range to the target is displayed through the display 400.

According to the present invention, the rangefinder for outputting low-power laser beams and using the laser beams reflected from a target to detect the range to the target, can easily and accurately detect the target signal hidden in the noise, thereby increasing the range-finding performance of a low-power vision protection laser diode rangefinder.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for finding a range, comprising:
   (a) receiving laser beams reflected from a target, and converting the same into a corresponding photocurrent signal, and converting the signal into a voltage signal;
   (b) canceling a noise component from the voltage signal and converting the noise-cancelled voltage signal into range-finding data;
   (c) sequentially storing the range-finding data;
   (d) adding the stored range-finding data and previously processed and stored accumulated data, and storing results as accumulated data;
   (e) detecting data exceeding a threshold value from among the accumulated data as target signals; and
   (f) reading a target range based on the detected target signals, wherein
   (a) through (d) are repeated N times, and the accumulated data in (e) are obtained by repeating (a) through (d) N times,
   whrerin (b) further includes differentiating the voltage signal to cancel a voltage component that corresponds to the noise component and is superimposed on the voltage signal; and
   filtering the differentiated signal with a predetermined frequency bandwidth identical to a frequency band of the target signal,
   wherein the bandwidth satisfies $0.35/t_r$, wherein $t_r$ is a rising time of a laser pulse, and a cut-off frequency satisfies $1/2\tau$ wherein $\tau$ is a full width at half the maximum.

2. The method of claim 1, wherein (e) comprises: establishing a threshold value to satisfy the following conditions:

$$FAR = N_S \int_{L_T}^{\infty} \frac{1}{0.5\sqrt{N}\sqrt{2\pi}} e^{-\frac{(x-0.5N)^2}{0.5N}} dx = N_S \left(0.5 - \int_0^{TNR} \frac{1}{\sqrt{2\pi}} e^{-\frac{y^2}{2}} dy\right)$$

and $$P_D = \int_{L_T}^{\infty} \frac{1}{\sqrt{p(1-p)N}\sqrt{2\pi}} e^{-\frac{(x-pN)^2}{2p(1-p)N}} dx$$

$$= 0.5 + \int_0^{SNR(N)-TNR} \frac{1}{\sqrt{2\pi}} e^{-\frac{y^2}{2}} dy$$

where $P_D$ is a detection probability, FAR is a false alarm rate, $N_S$ is a number of range finding samples=maximum finding range/range finding resolving power, N is accumulated times, $L_T$ is a threshold value=$0.5\sqrt{N(TNR)}+0.5N$, TNR is a threshold-to-noise ratio, SNR (1) is a signal-to-noise ratio of the system, and SNR(N) is the SNR when accumulated N times=$\sqrt{N(SNR(1))}$.

3. The method of claim 1, wherein the target range in (f) is an address of a memory storing accumulated data greater than the threshold value.

4. A laser rangefinder for finding a range to a target using laser beams, comprising:
   a laser receiver for receiving laser beams reflected from the target to output an electrical signal, canceling a noise component provided in the electrical signal, and outputting binary range-finding data;
   a data accumulator, including a frame memory, for adding the range-finding data output by the laser receiver and previously accumulated data stored in the frame memory, storing the added results in the frame memory, and repeating the adding and storing operations for an established time; and
   a range detector for producing a target range to the target based on the accumulated data stored in the frame memory,
   wherein the laser receiver comprises:
   a photodetector for receiving the laser beams and outputting a corresponding photocurrent signal;
   an amplifier for amplifying the photocurrent signal and converting it into a voltage signal;
   a differentiator for differentiating the voltage signal and canceling a noise voltage component superimposed on the voltage signal;
   a filter for filtering the differentiated signal; and
   a signal converter for converting the filtered signal into binary range-finding data, and outputting the range-finding data for each frame,
   wherein the signal converter comprises a zero voltage detector for comparing the filtered signal with a zero voltage, and outputting 1 when the signal is a positive voltage, and 0 when the signal is a negative voltage.

5. The laser rangefinder of claim 4, wherein the data accumulator further comprises:
   a shift register for sequentially storing the range-finding data;
   an adder for adding the range-finding data stored in the shift register and previously accumulated data stored in the frame memory, and storing the added results in the frame memory;
   a counter for counting range-finding time; and
   a timing controller for operating the shifter register and the adder until the range-finding time exceeds the established time, and repeating the storing, operating, and accumulating process of the range-finding data N times.

6. The laser rangefinder of claim 5, wherein the laser receiver further comprises a receiver for receiving laser beams output from the rangefinder to generate a laser oscillation signal,
   the timing controller generates a laser start pulse according to the laser oscillation signal, and repeats the storing, operating, and accumulating process of the range-finding data N times until a laser stop pulse is provided, and
   the range counter counts range-finding time according to the laser start pulse, and outputs a laser stop pulse to the timing controller when the counted range-finding time exceeds the established time.

7. The laser rangefinder of claim 5, wherein the data accumulator further comprises an address controller for controlling data storage into the shift register and the frame memory.

8. The laser rangefinder of claim 4, wherein the range detector comprises:
    a target signal detector for detecting the data exceeding the established threshold value as a target signal from among the accumulated data stored in the frame memory; and
    a range reader for reading an address of the frame memory storing the detected target signal as a target range.

9. The laser rangefinder of claim 8, wherein the range reader sorts target signals in the ascending order according to addresses of the frame memory storing the target signals when the detected target signals are plural, and the range reader reads the address having the largest value as a target range of the target from among the sorted addresses.

10. The laser rangefinder of claim 4, further comprising a display for displaying the target range.

11. A range detecting device of a laser rangefinder for finding a range to a target using laser beams, the range detecting device for detecting a target range based on range-finding data corresponding to the laser beams reflected and received from the target, comprising:

a data accumulator including: a shift register for sequentially storing the range-finding data; a frame memory for storing previously accumulated data; an adder for adding the range-finding data stored in the shift register and the previously accumulated data stored in the frame memory, and storing the added results in the frame memory; a counter for counting range-finding time; and a timing controller for operating the shifter register and the adder until the range-finding time exceeds the established time, and repeating the storing, operating, and accumulating process of the range-finding data N times; and a range detector including: a target signal detector for detecting data exceeding an established threshold value as target signals from among accumulated data stored in the frame memory; and a range reader for reading an address of the frame memory storing the detected target signal as a target range.

* * * * *